Patented June 28, 1938

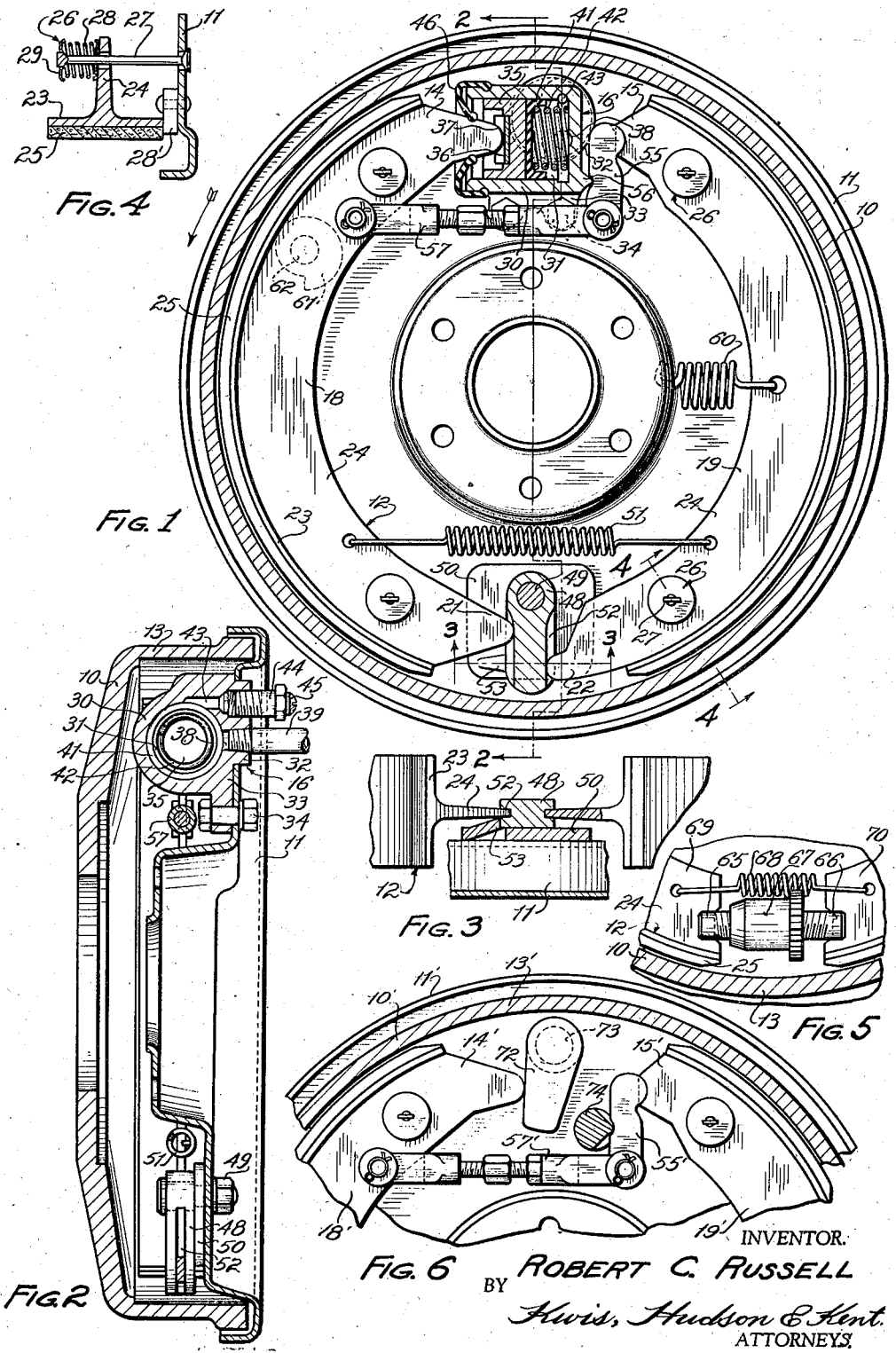

2,122,296

UNITED STATES PATENT OFFICE 2,122,296

BRAKE

Robert C. Russell, Shaker Heights, Ohio, assignor to Eaton Manufacturing Company, Cleveland, Ohio, a corporation of Ohio Application October 23, 1936, Serial No. 107,162

3 Claims. (Cl. 188—78)

This invention relates to brakes, and more particularly to an improved brake of the internal expanding self-energizing type which is especially suited to use on the wheels of motor vehicles.

An object of my invention is to provide an improved self-energizing brake of relatively simple and inexpensive construction which will afford a positive control and a smooth and efficient action during braking.

Another object of my invention is to provide an improved brake comprising a friction device and driver operated actuating means therefor, and having means operable to cause torque reaction from the braking operation to oppose the brake applying force.

Still another object of my invention is to provide an internal expanding self-energizing brake having a high degree of controllability obtained through the use of means operable to cause the torque reaction of the braking operation to oppose the driver controlled means operating to apply the brake.

Yet another object of my invention is to provide an improved self-energizing brake comprising a friction device and a brake applying means, and having means adapted to transmit torque reaction in opposition to the applied force in response to circumferential shifting of the friction device.

A further object of my invention is to provide an improved brake having a plurality of brake shoes and novel means for equalizing the braking action between the shoes.

Still another object of my invention is to provide an improved brake of the multiple-shoe type in which the equalizing means comprises a pivoted member between the adjacent shoe ends and engaged thereby at different lever arm distances.

Other objects and advantages of my invention will be apparent from the following description when taken in conjunction with the accompanying sheet of drawings, in which—

Fig. 1 is a sectional view taken through a brake embodying my invention and showing the friction device in elevation.

Fig. 2 is a transverse sectional view of the brake taken on line 2—2 of Fig. 1.

Fig. 3 is a partial sectional view taken through the equalizing means, as indicated by line 3—3 of Fig. 1.

Fig. 4 is a partial sectional view taken through the shoe locating or aligning means, as indicated by line 4—4 of Fig. 1.

Fig. 5 is a partial sectional view illustrating another form of operating connection for the adjacent ends of the brake shoes, and Fig. 6 is a partial sectional view illustrating another form of brake applying means.

More detailed reference will presently be made to the accompanying drawing in describing the improved brake of my invention but, before proceeding with such detailed description, it should be understood that the invention is not limited to the particular forms of construction here illustrated, but may be embodied in various other designs and constructions.

My improved brake, as illustrated in Figs. 1 and 2, may comprise a brake drum 10 which is mounted for rotation adjacent a support or backing plate 11, and a friction device 12 inside the drum for braking cooperation with the inner surface of the annular drum flange 13.

The friction device 12 extends circumferentially adjacent the drum flange 13 and has ends 14 and 15 which cooperate with a combined anchor device and brake applying means 16. When the friction device is formed by a pair of brake shoes 18 and 19, as in this instance, the device is articulated by an operating connection located substantially diametrically opposite the device 16 to cooperate with the adjacent ends 21 and 22 of the brake shoes. The brake shoes themselves may be of any suitable construction, for example, they may be arcuate shoes of substantially T-cross section in which the top of the T-section is formed by the arcuate flange 23 and the stem of the T-section is formed by the web 24. A brake lining 25 of suitable characteristics may be applied to the arcuate flange 23 for frictional cooperation with the inner surface of the drum flange 13 when the shoe is pressed thereagainst.

The shoes of the friction device are supported within the brake drum 10 so as to have limited circumferential movement therein and are yieldingly centered with respect to the inner face of the drum flange 13 by aligning devices 26. In this instance two such aligning devices are provided for each shoe and each of these devices includes a headed pin 27 which extends through substantially aligned oversize openings of the backing plate 11 and the web 24 of the brake shoe. A compression spring 28 surrounding the pin and engaging one face of the web 24 yieldingly presses one edge of the flange 23 against a bearing lug 28'. A washer 29 locked on the pin adjacent its free end provides a retaining means and seat for the spring.

For applying the brake and regulating the action of the shoes of the friction device I provide the combined anchor device and brake applying means 16. While various forms of brake applying means may be employed, I show, in this instance, an actuator of the hydraulic type. In this device a body 30 having a fluid pressure cylinder 31 therein is mounted on the backing plate 11 and forms a stop or anchor against which the end 15 of the friction device acts during ahead braking. The body 30 may be mounted on the backing plate by being provided with an integral projection 32 which engages in an opening of the plate, and an integral flange 33 which is clamped against the plate by bolts 34. A piston 35 is slidable in the cylinder 31 and cooperates with the end 14 of the shoe 18, which end may extend part-way into the cylinder. The outer end of the piston 35 may be provided with a plate or bearing member 36 of hardened material which is engaged by a rounded or cam-like portion 37 of the shoe end.

Fluid pressure may be supplied to the cylinder 31 through a passage 38 of the projection 32 and a pipe 39 communicating with this passage. The pipe 39 may lead from a fluid pressure creating device, such as a pressure cylinder with which a pedal or other driver operated member is connected. Leakage of pressure fluid past the piston 35 may be prevented by a sealing disk or cup 41 held in engagement with the inner end of the piston by a compression spring 42. Air which becomes trapped in the cylinder 31 may be eliminated therefrom by the provision of an escape passage 43 communicating with the extreme top of the cylinder, and a tubular fitting 44 which is normally closed by a screw plug 45. The operating connection between the bearing member 36 of the piston and the cam portion 37 of the friction device may be protected against the entry of dirt and other foreign matter by a cup-like sealing gasket 46 mounted on the outer end of the body 30 and having an opening which surrounds and grips the projecting end 14 of the friction device.

When fluid pressure is supplied to the cylinder 31 the piston 35 moves outwardly and presses the shoe 18 against the drum surface. During ahead braking the drum is rotating in the direction indicated by the arrow and tends to carry the shoe along with it. This automatically increases the pressure of the shoe against the drum and produces what is known as self-energization. The circumferential movement of the shoe 18 is utilized in actuating the shoe 19. Motion is transmitted from the shoe 18 to the shoe 19 through an operating connection to be presently described, and presses the latter shoe against the drum surface. During ahead braking the shoe 19 also tends to move with the drum thereby producing self-energization of this shoe and causing the end 15 thereof to act against the combined anchor and brake applying device 16.

For transmitting motion from the shoe 18 to the shoe 19 any appropriate form of operating connection may be provided between the shoe ends 21 and 22 but, as a feature of my invention, I provide a connection at this point which causes the braking action to be substantially equalized between the two shoes and results in more satisfactory brake performance than has been obtainable heretofore. The operating connection between the shoe ends may be formed by a pivoted member, in this instance a lever 48 which is mounted on a pivot pin 49 and extends outwardly between the adjacent shoe ends. The pin 49 is carried by the backing plate 11 and extends through a bearing plate 50 with which the lever 48 has sliding engagement.

To obtain the desired equalization of the braking action I provide for operation of the lever 48 such that only a portion, for example 50%, of the force exerted against the lever by the shoe end 21 is transmitted to the shoe 19. This effect is obtained by arranging the shoe end 21 in inwardly offset relation to the shoe end 22, so that the shoe end 22 engages the lever at a greater distance from the pivot pin 49 and the center of the brake drum than the lever end 21. The relation between these shoe ends and the effective lever arms may be varied to secure the most satisfactory operating conditions. The shoe ends 21 and 22 may be maintained in engagement with the lever 48 by a tension spring 51 having its ends connected with the respective shoes. Lateral shifting of the shoe ends relative to the lever may be minimized by providing opposite sides of the lever with grooves 52 in which the shoe ends engage.

During ahead braking the tendency of the shoe 18 to move with the brake drum causes the lever 48 to swing in a counterclockwise direction on the pivot pin 49, and this movement of the lever causes the shoe 19 to be pressed outwardly against the drum surface. During reverse braking the shoe 19 tends to travel in the reverse direction with the drum and tends to swing the lever 48 in a clockwise direction on the pivot pin. To prevent this clockwise swinging of the lever 48 I provide a stop 53 which is engaged by the lever when the latter assumes the substantially radial position shown in Fig. 1. This stop may be in the form of a lug struck up from the bearing plate 50.

Reverting now to the combined anchor device and brake applying means 16, it will be noted that the shoe end 15 does not directly engage the body 30 but engages a lever 55 which has an intermediate part thereof fulcrumed on a projection 56 of the body. The inner end of the lever 55 is connected with the shoe 18 adjacent the end 14 thereof by a link 57 which is preferably adjustable as to length. The means represented by the lever 55 and the link 57 constitutes an important part of my invention because it functions as an automatic regulating means and serves to transmit torque reaction in a direction to oppose the brake applying force whereby better control of the braking operation is made available to the driver. In explanation of this function it is pointed out that when the piston 35 moves outwardly of its cylinder, as when the driver presses his brake pedal, the shoe 18 is pressed against the brake drum and, at substantially the same time, motion is transmitted through the link 57 and the lever 55 to press the adjacent end of the brake shoe 19 against the drum. The pressing of the latter shoe against the drum by this linkage and by the self-energizing action derived from the shoe 18, causes it to travel circumferentially with the brake drum and this causes the shoe end 15 to act against the lever 55 in opposition to the brake applying force being transmitted through the linkage. The opposing force applied to the lever 55 by the shoe end 15 is transmitted through the link 57 and, acting on the end 14 of the shoe 18, tends to draw this end away from the drum surface and at the same time tends to move the piston 35 inwardly of its cylinder. Such inward movement of the piston opposes the brake applying force being transmitted from the driver or the actuating means controlled by him. This opposing force is very desirable because it increases the brake applying force required to be exerted by the operator to an extent affording a much more reliable and satisfactory control over the braking operation than has been obtainable heretofore in brakes of the self-energizing type. With the arrangement which I have provided it will be readily seen that if the driver uses too much pedal pressure in applying the brake it will not result in sudden grabbing action which has heretofore characterized self-energizing brakes in general, because torque reaction transmitted through the lever 55 and the link 57 acts on the shoe end 14 to move it away from the drum surface and thus automatically reduces what would otherwise be an excessive braking action.

A tension spring 60 acting on the shoe 19 tends to swing this shoe away from the drum surface when the brake applying force is released, and the pull of this spring transmitted through the lever 55 and the link 57 also tends to swing the shoe 18 away from the drum surface. The spacing of the brake lining of the shoes from the drum surface when the brake is fully released may be determined by providing a stop against which some portion of the shoe 18 engages. In this instance the stop is in the form of a cam 61 which is mounted on the backing plate and has an actuating stem 62 extending therethrough whereby the cam may be adjusted from the exterior of the brake.

It is not altogether necessary that advantage be taken of the equalizing feature of my invention and, therefore, in some instances, an operating connection of the turnbuckle form shown in Fig. 5 of the drawing may be provided. This modified form of operating connection comprises studs 65 and 66 which have right and left-hand threads and are screwed into an adjusting nut 67. A tension spring 68 normally holds the shoe ends 69 and 70 against the studs with the web portions of the shoes engaging in slots of the studs. By rotation of the nut 67 the spacing of the shoe ends can be varied to compensate for wear of the brake linings and to alter the operating characteristics of the brake.

I have indicated above that the actuating means for my brake may be other than of the hydraulic type and, in Fig. 6, I have shown actuating means in the form of a cam 72 which cooperates with the end 14' of the friction device for pressing the shoe 18' against the surface of the drum flange 13'. The cam 72 may be carried by a rock shaft 73 which has operative connection with a brake pedal or some other driver controlled member.

In this modified form of construction the anchor with which the end 15' of the friction device cooperates is in the form of a pin 74 projecting inwardly from the backing plate 11'. The anchor 74 provides a fulcrum for a lever 55' which, with the link 57' connects the shoe ends 15' and 14' in a similar manner and for the same purpose as the lever 55 and link 57 of Fig. 1.

From the foregoing description and the accompanying drawing it should now be readily understood that I have provided a novel form of self-energizing brake in which torque reaction from the braking operation is transmitted in a direction to oppose the pedal pressure being exerted by the driver to apply the brake, and that this use of the torque reaction provides for a more positive and reliable control as well as a self-regulated and smoother braking operation. It will also be readily understood that the equalizing feature of my improved brake provides for increased efficiency and uniformity of wear by dividing the braking action substantially equally between the two brake shoes.

While I have illustrated and described my improved brake in a somewhat detailed manner, it should be understood, of course, that I do not wish to be limited to the precise details of construction and arrangements of parts herein disclosed, but regard my invention as including such changes and modifications as do not constitute a departure from the spirit of the invention and the scope of the appended claims.

Having thus described my invention, I claim:

1. In combination, a drum, a friction device cooperating with a surface of the drum and having spaced ends, an actuator having a housing disposed between said ends and a member movable in the housing for applying a braking force to one of said ends, a lever fulcrumed on said housing and having one arm thereof connected with the other of said ends, and a link connecting the other arm of said lever with said one end of the friction device.

2. In combination, a drum, a friction device cooperating with a surface of the drum and having spaced ends, an actuator having a housing disposed between said ends and a member movable in the housing for applying a braking force to one of said ends, a lever fulcrumed at an intermediate point on said housing and engaged by the other of said ends outwardly of the fulcrum point, and a link connected with said one end and with said lever inwardly of the fulcrum point.

3. In combination, a brake drum, a backing plate adjacent the drum, a friction device cooperating with a surface of the drum and having spaced ends, an actuator having a housing disposed between said ends and mounted on the backing plate to provide a stop for the friction device, a member movable in the housing for applying braking force to an adjacent end of the friction device, a lever fulcrumed on said housing and having an arm engaging the other end of the friction device, and a link connecting the other arm of the lever with said adjacent end of the friction device.

ROBERT C. RUSSELL.